(12) United States Patent
Nishiyama

(10) Patent No.: US 9,274,610 B2
(45) Date of Patent: Mar. 1, 2016

(54) ELECTRONIC EQUIPMENT, LETTER INPUTTING METHOD AND PROGRAM

(71) Applicant: Sho Nishiyama, Kanagawa (JP)

(72) Inventor: Sho Nishiyama, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 163 days.

(21) Appl. No.: 13/739,698

(22) Filed: Jan. 11, 2013

(65) Prior Publication Data
US 2014/0198045 A1    Jul. 17, 2014

(51) Int. Cl.
*G06F 3/02*    (2006.01)

(52) U.S. Cl.
CPC ........................ *G06F 3/02* (2013.01)

(58) Field of Classification Search
None
See application file for complete search history.

(56) References Cited

U.S. PATENT DOCUMENTS

| | | | |
|---|---|---|---|
| 8,281,251 B2 * | 10/2012 | Jo | 715/771 |
| 2010/0105438 A1 * | 4/2010 | Wykes et al. | 455/566 |
| 2010/0180235 A1 * | 7/2010 | Griffin et al. | 715/841 |
| 2011/0291820 A1 * | 12/2011 | Krahenbuhl et al. | 340/407.2 |
| 2012/0044175 A1 * | 2/2012 | Cho | 345/173 |
| 2012/0274565 A1 * | 11/2012 | Moser | 345/168 |
| 2014/0078063 A1 * | 3/2014 | Bathiche et al. | 345/168 |

FOREIGN PATENT DOCUMENTS

| | | |
|---|---|---|
| JP | 9-23261 A | 1/1997 |
| JP | 2002-244791 A | 8/2002 |
| JP | 2007-60074 A | 3/2007 |

* cited by examiner

*Primary Examiner* — Joseph Feild
*Assistant Examiner* — Emily Frank
(74) *Attorney, Agent, or Firm* — Sughrue Mion, PLLC

(57) ABSTRACT

An electronic device comprises a display unit that displays a letter/character; a touch pressing input unit including a plurality of keys arrayed in a matrix; the touch pressing input unit allowing touch-inputting a letter/character corresponding to a key touched by a user's finger; the touch pressing input unit allowing pressing-inputting a letter/character corresponding to a key pressed; and a control unit that manages control to cause the letter/character input by the touch pressing input unit to be displayed on the display unit; the control unit managing control so that, if a key is touched and pressed at the touch pressing input unit with the user's finger, a letter/character corresponding to the key pressed is displayed on the display unit, and so that, if a key is touched and released without being pressed by the user's finger at the touch pressing input unit, a letter/character corresponding to a key displaced at a position from which the user's finger has been released is displayed on the display unit.

15 Claims, 10 Drawing Sheets

(EXAMPLE 1)

FIG. 1 (EXAMPLE 1)

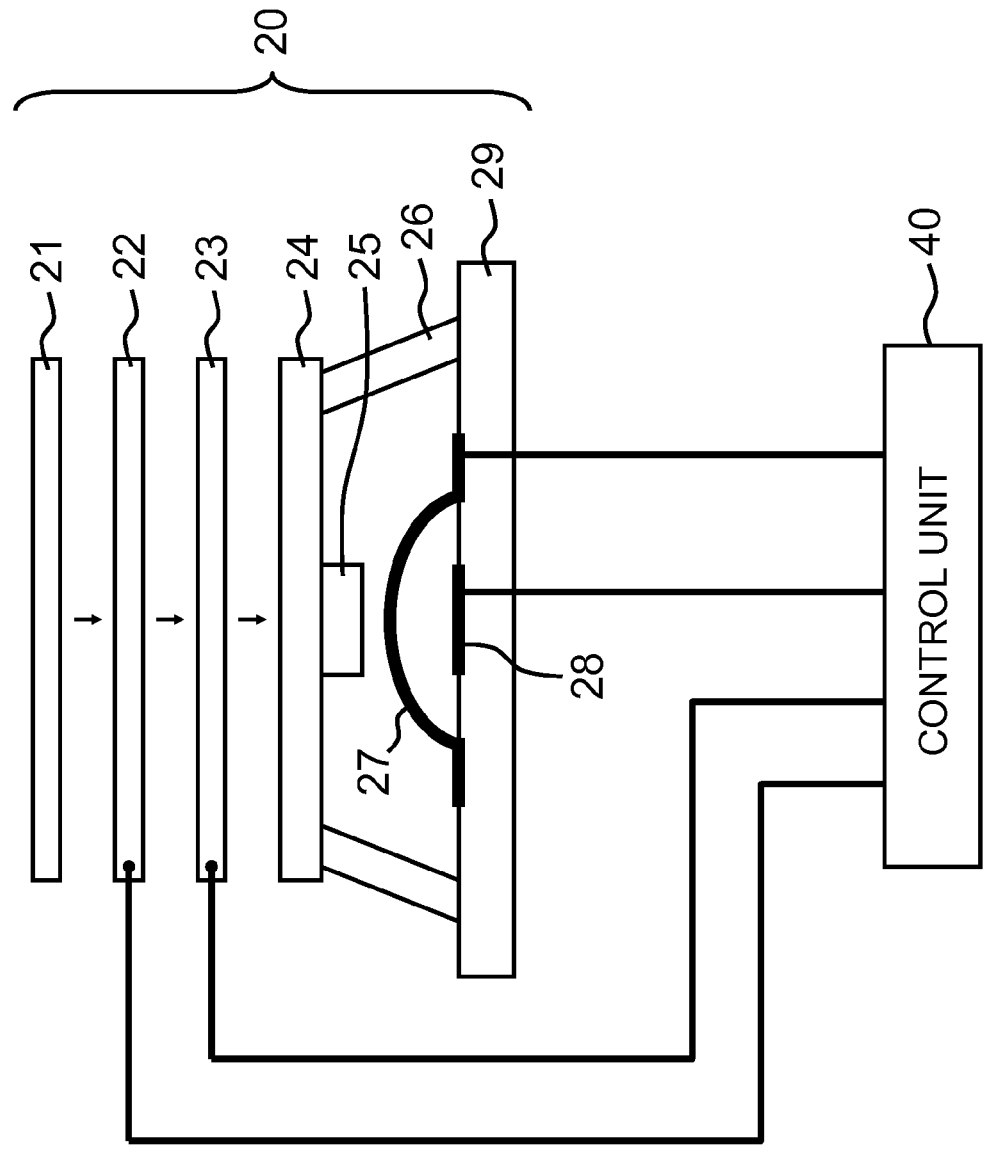

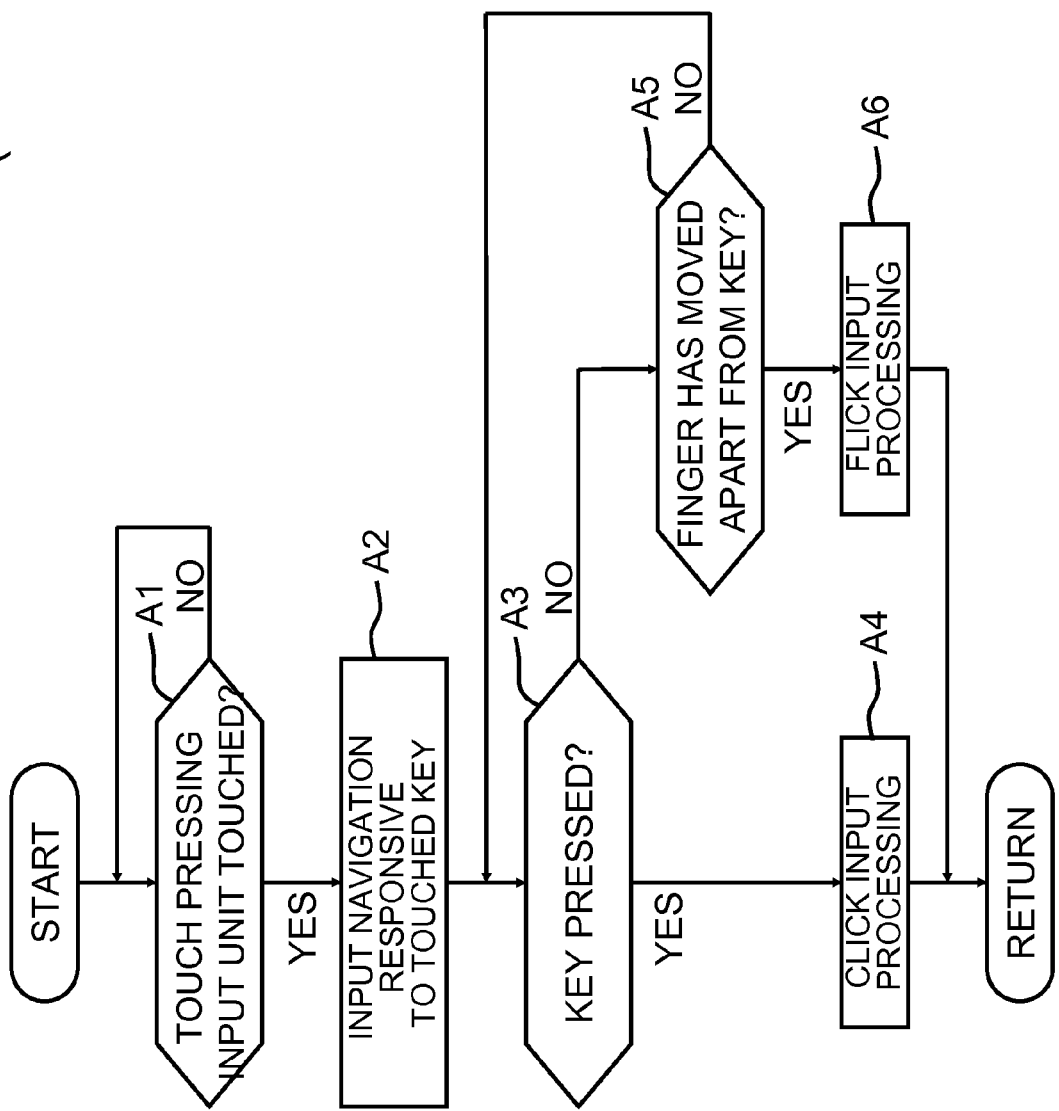
FIG. 4 (EXAMPLE 1)

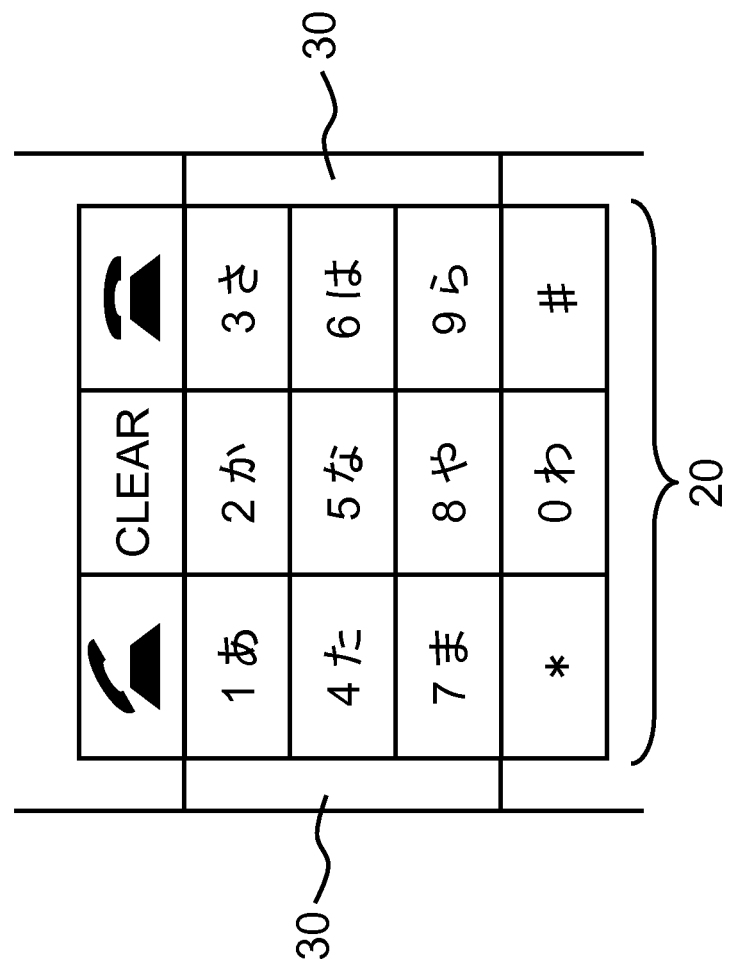
FIG. 5 (EXAMPLE 1)

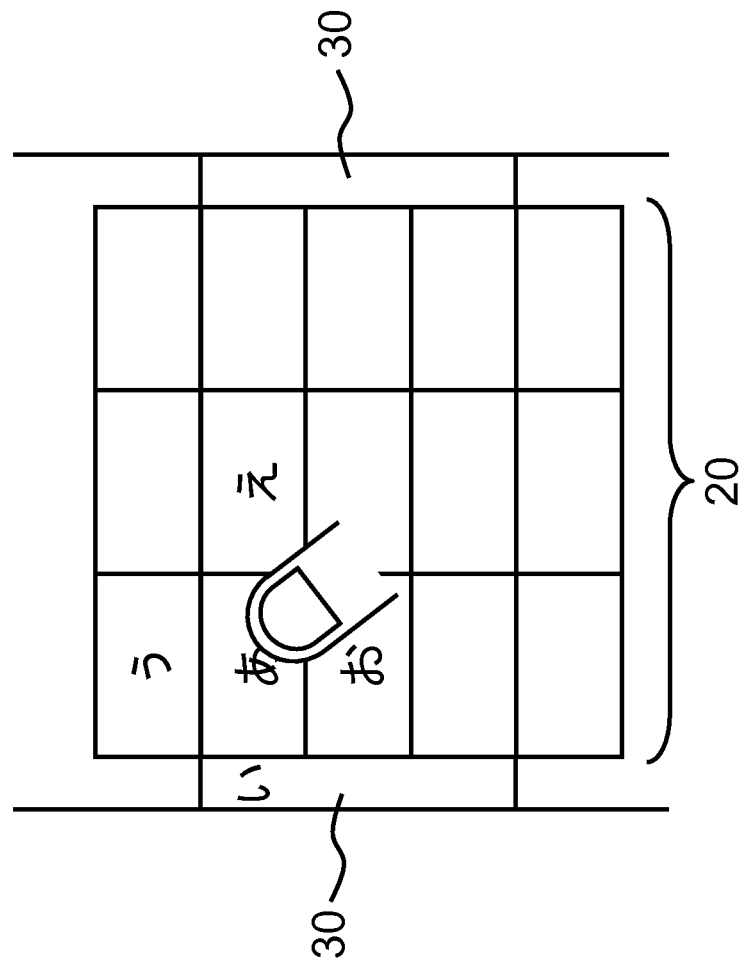
FIG. 6 (EXAMPLE 1)

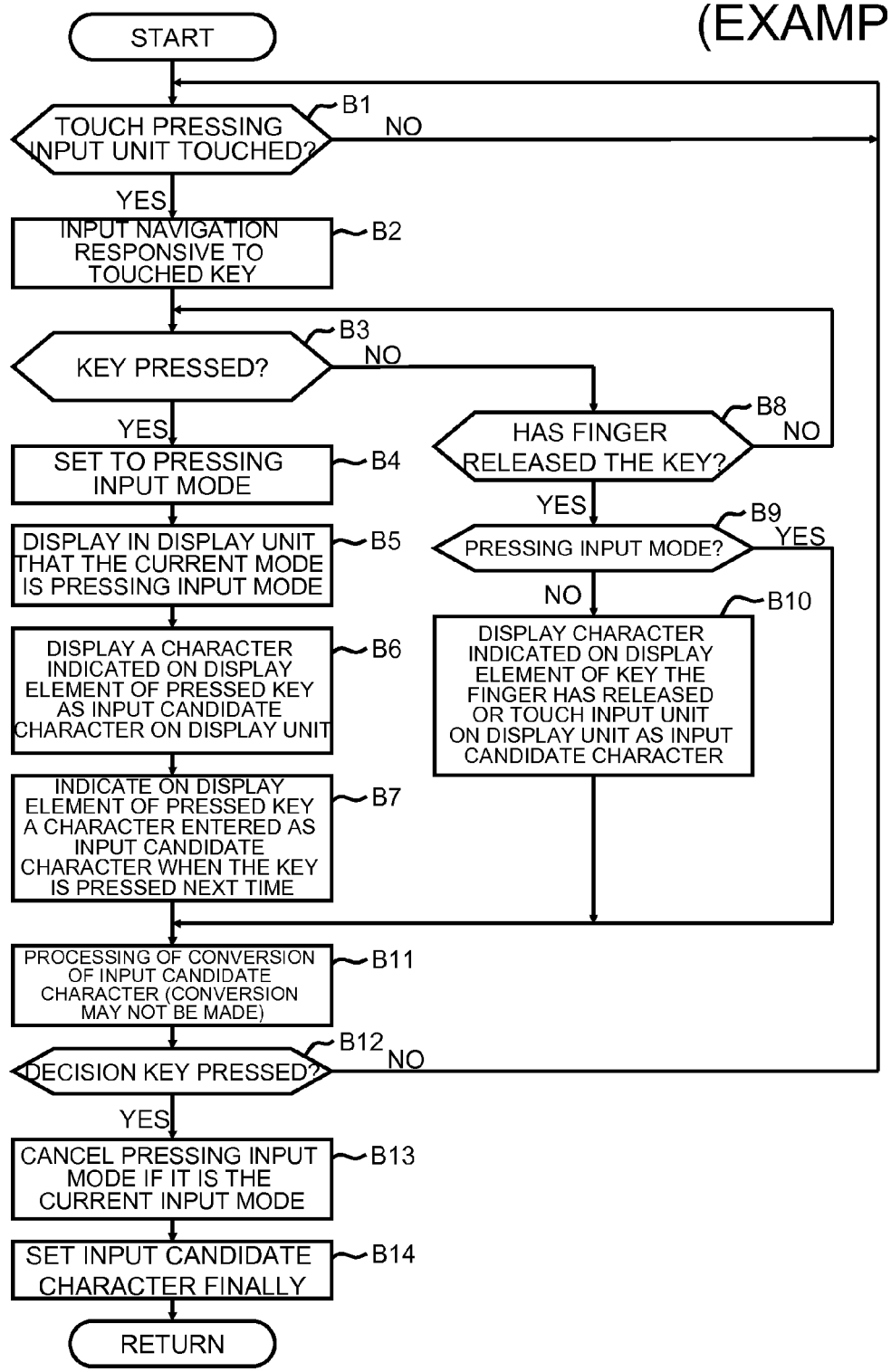

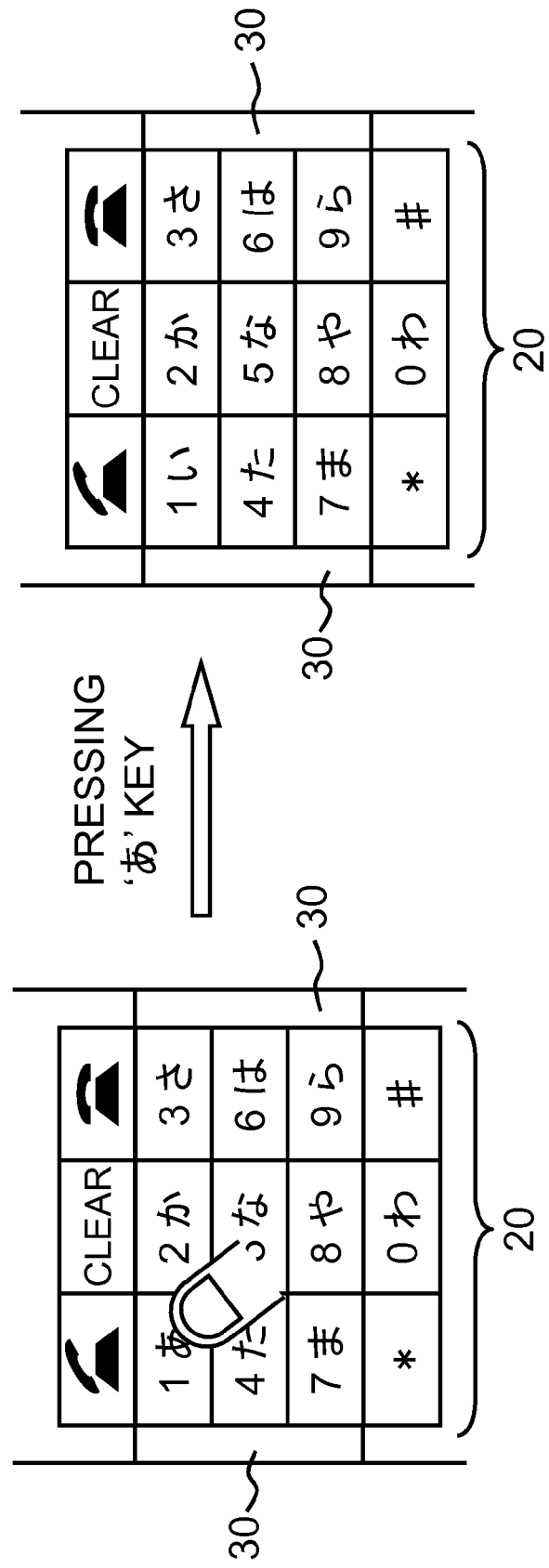
FIG. 8 (EXAMPLE 2)

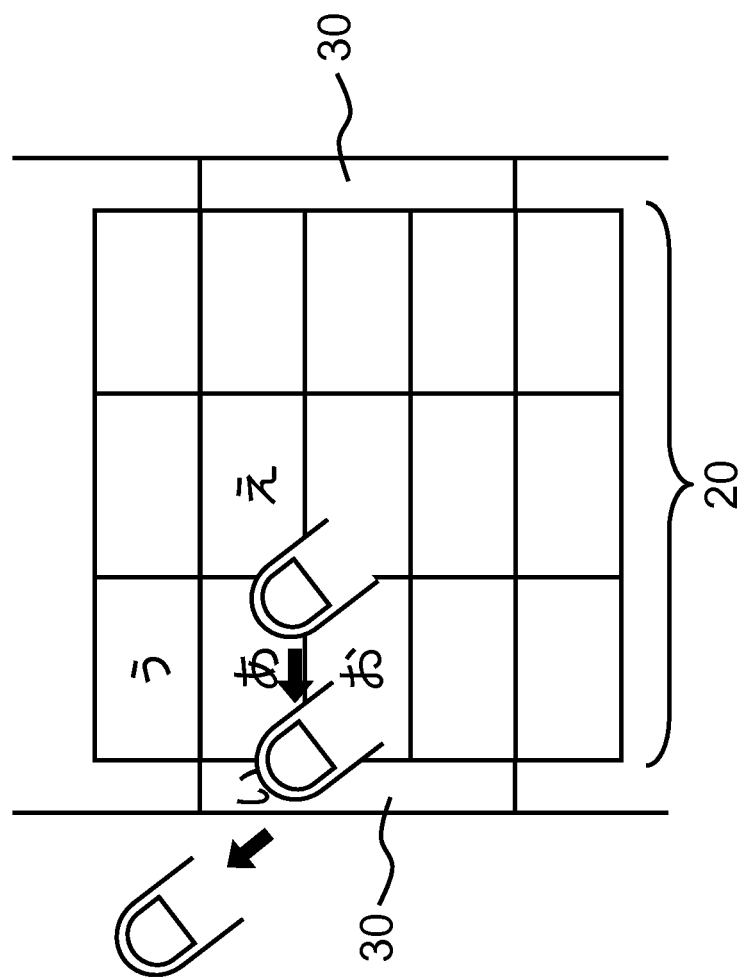
FIG. 9 (EXAMPLE 2)

FIG. 10 (EXAMPLE 3)
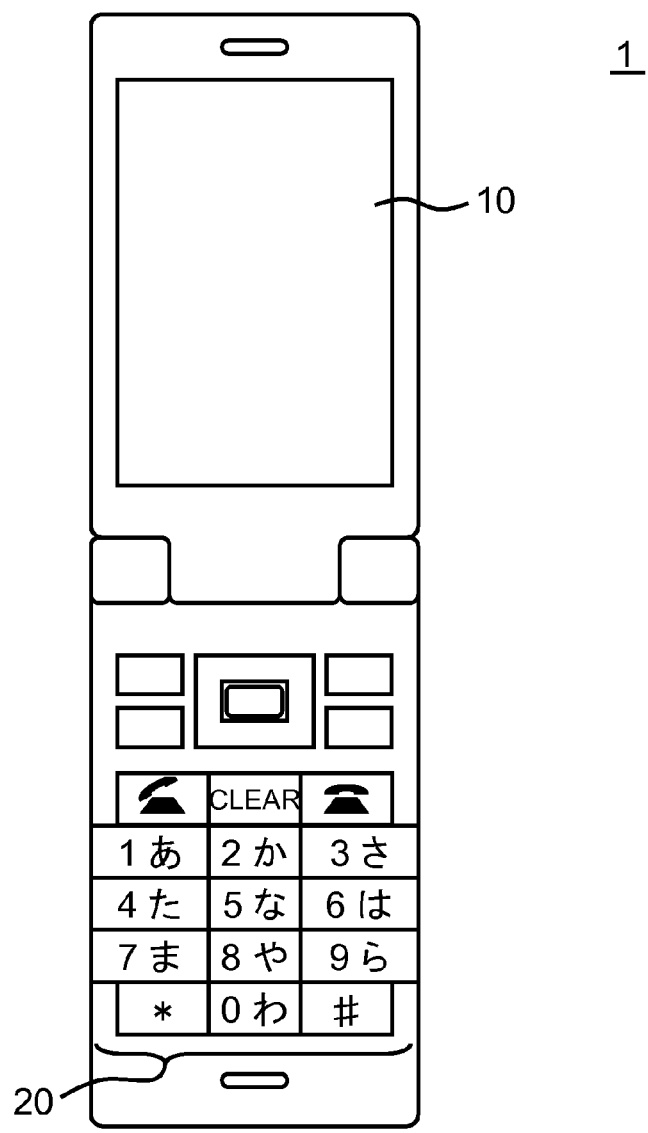

ELECTRONIC EQUIPMENT, LETTER INPUTTING METHOD AND PROGRAM

TECHNICAL FIELD

Reference to Related Application

The present application is based upon Japanese patent application No. 2010-281472 filed on Dec. 17, 2010, now laid-open as JP Kokai Publication No. JP-P2012-128774A on Jul. 5, 2012, the disclosure of which is incorporated herein in its entirety by reference thereto.
This invention relates to an electronic device capable of inputting a letter/character, a letter/character inputting method, and a program. More particularly, it relates to an electronic device that allows selecting a key pressing input or a flick input, a letter/character inputting method, and a program.

BACKGROUND

Heretofore, a key pressing input method of pressing a key that imparts a sense of click in inputting was prevalently used in this country as a letter/character inputting method for a mobile electronic device. Recently, such a mobile electronic device carrying a touch panel of a large format is becoming popular globally such that its share on the market is increasing in Japan as well. As the mobile electronic devices, carrying the touch panel, become popular, an increasing number of the mobile electronic devices use a touch input method in which the touch panel is touched for inputting. In light of the above, it has been proposed that both a key pressing input method and a touch input method may selectively be used in legacy electronic devices (see Patent Literatures 1 and 2).
[Patent Literature 1] JP Patent Kokai Publication No. JP-P2002-244791A
[Patent Literature 2] JP Patent Kokai Publication No. JP-P2007-60074A
[Patent Literature 3] JP Patent Kokai Publication No. JP-A-9-23261

SUMMARY

However, in the legacy electronic devices that allow using both the key pressing input method and the touch input method, there is fear that a key is inadvertently touched during the key pressing input to make a touch input erroneously, or that a key is inadvertently pressed during the touch input to make a pressing input erroneously.

Recently, a flick input method, different from the touch input method, is attracting notice as the Japanese language inputting method. In the flick input method, if a character 'い' (I) is to be input, a 'あ' (A) key is touched to display a 'い' (I) key, a 'う' (U) key, a 'え' (E) key and a 'お' (O) key. The user's finger is then slid to over the 'い' (I) key to input the corresponding character. Since there are many users who favor the key pressing input method and also many users who favor the flick input method, such an electronic device that allows selectively using the two methods is thought to be desirable.

It is a principal object of the present invention to provide an electronic device, a letter/character inputting method and a program, whereby both the key pressing input method and the flick input method may be used in such a manner as to avoid mistaken inputting failure.

In a first aspect of the present invention, there is provided an electronic device including a display unit that displays a letter/character and a touch pressing input unit including a plurality of keys arrayed in a matrix. The touch pressing input unit allows touch-inputting a letter/character corresponding to a key touched by a user's finger. The touch pressing input unit also allows pressing-inputting a letter/character corresponding to a key pressed. The electronic device also includes a control unit that manages control to cause the letter/character to input by the touch pressing input unit to be displayed on the display unit. The control unit manages control so that, if a key is touched and pressed at the touch pressing input unit with the user's finger, a letter/character corresponding to the key pressed is displayed on the display unit, and so that, if a key is touched and released without being pressed by the user's finger at the touch pressing input unit, a letter/character corresponding to a key disposed at a position from which the user's finger has been released, (i.e., a key released by the user's finger) is displayed on the display unit.

In the electronic device according to the present invention, it is preferred that, upon initiation of an input operation at the touch pressing input unit, if the key is touched and pressed by the user's finger at the touch pressing input unit, the control unit sets a pressing input mode as a current input mode. The control unit sets a touch input mode as a current input mode if the key is touched and released without being pressed by the user's finger at the touch pressing input unit.

In the electronic device according to the present invention, preferably the control unit fixedly secures the input mode to the pressing input mode or to the touch input mode until an input letter/character is finally determined or until an application being used comes to a close.

In the electronic device according to the present invention, preferably a pre-set one or ones of the plurality of keys is transversely (or laterally) elongated in shape as compared to the other keys.

Preferably, the electronic device according to the present invention further includes a touch input unit arranged at a pre-set location at a periphery of the touch pressing input unit. The touch input unit is able to touch-input a corresponding letter/character when the touch input unit is touched by the user's finger. The control unit manages control to display the corresponding letter/character in the display unit when the user's finger has touched and released the touch input unit.

In the electronic device of the present invention, the touch pressing input unit preferably includes, from one key to another, a key member arranged on a substrate via a hinge exhibiting repellant elasticity, a dome-shaped contact, a fixed contact and a tactile sensor. The dome-shaped contact and the fixed contact come into contact with each other when the key member is pressed such as to detect the pressing of the key. The tactile sensor is mounted on the key member to detect touching by the user's finger.

In the electronic device of the present invention, the touch input unit preferably includes another tactile sensor different from the above mentioned tactile sensor to detect touch pressure by the user's finger.

In the electronic device according to the present invention, the touch pressing input unit preferably includes a display element to display a letter/character from one key to another. The touch input unit includes another display element to display a letter/character. The control unit manages control so that, when a user's finger has touched a key for a pre-set time, an input navigation corresponding to the key touched will be displayed on the corresponding display element and on the other display element.

In the electronic device according to the present invention, preferably the control unit is set to one out of the pressing input mode and the touch input mode depending on the application being used. Or, the user is preferably capable of selectively setting the mode.

In the electronic device according to the present invention, the control unit preferably sets a telephone number input mode when the display unit displays a standby display picture and a user's finger has pressed a key in the touch pressing input unit. The control unit also preferably sets an address book searching mode or a Web searching mode when the display unit displays a standby display picture and the user's finger has touched and then released the key in the touch pressing input unit.

In a second aspect of the present invention, there is provided a method for inputting a letter/character using an electronic device that comprises: a display unit that displays a letter/character, a touch pressing input unit including a plurality of keys arrayed in a matrix, and a control unit that manages control to cause the letter/character input by the touch pressing input unit to be displayed on the display unit. The touch pressing input unit allows touch-inputting a letter/character corresponding to a key touched by a user's finger. The touch pressing input unit allows pressing-inputting a letter/character corresponding to a key pressed. The method includes displaying, when a key is touched and pressed at the touch pressing input unit by a user's finger, a letter/character corresponding to the key pressed on the display unit, and displaying, when a key is touched and released without being pressed by the user's finger at the touch pressing input unit, a letter/character corresponding to the key released by the user's finger (i.e., a key disposed at a position from which the user's finger has been released) in the display unit.

In a third aspect of the present invention, there is provided a non-transitory computer-readable medium storing a program executed by an electronic device. The electronic device includes: a display unit that displays a letter/character, a touch pressing input unit including a plurality of keys arrayed in a matrix, and a control unit that manages control to cause the letter/character input by the touch pressing input unit to be displayed on the display unit. The touch pressing input unit allows touch-inputting a letter/character corresponding to a key touched by a user's finger. The touch pressing input unit also allows pressing-inputting a letter/character corresponding to a key pressed. The program allows executing: displaying, when a key is touched and pressed in the touch pressing input unit by a user's finger, a letter/character corresponding to the key pressed on the display unit, and displaying, when a key is touched and released without being pressed by the user's finger at the touch pressing input unit, a letter/character corresponding to a key released by the user's finger (i.e., a key disposed at a position from which the user's finger has been released) on the display unit.

The meritorious effects of the present invention are summarized as follows.

According to the present invention, in a configuration in which both the conventional pressing input method that imparts the sense of click and the more recent touch input method used in a touch panel mobile phone may be used to enter a letter/character, it is possible to avoid inputting failure caused by confusion between the two input methods.

BRIEF DESCRIPTION OF DRAWINGS

FIG. 3 is a schematic view showing a configuration of a touch pressing input unit in the electronic device according to Example 1 of the present invention.

FIG. 4 is a flowchart schematically showing an operation of a control unit in the electronic device according to Example 1 of the present invention.

FIG. 5 is a schematic plan view showing a display state during usual operating times in the touch pressing input unit and the touch input unit of the electronic device according to Example 1 of the present invention.

FIG. 6 is a schematic plan view showing an example display state after touching a 'あ' (A) key of the touch pressing input unit and the touch input unit in the electronic device according to Example 1 of the present invention.

FIG. 7 is a flowchart schematically showing an operation of the control unit in an electronic device according to Example 2 of the present invention.

FIG. 8 is a schematic plan view showing changes in the display state when pressing a 'あ' (A) key of the touch pressing input unit in the electronic device according to Example 2 of the present invention.

FIG. 9 is a schematic plan view showing an input operation when inputting 'い' (I) at the touch input unit in the electronic device according to Example 2 of the present invention.

FIG. 10 is a schematic plan view showing an appearance of an electronic device according to Example 3 of the present invention.

MODES

Figure 1:
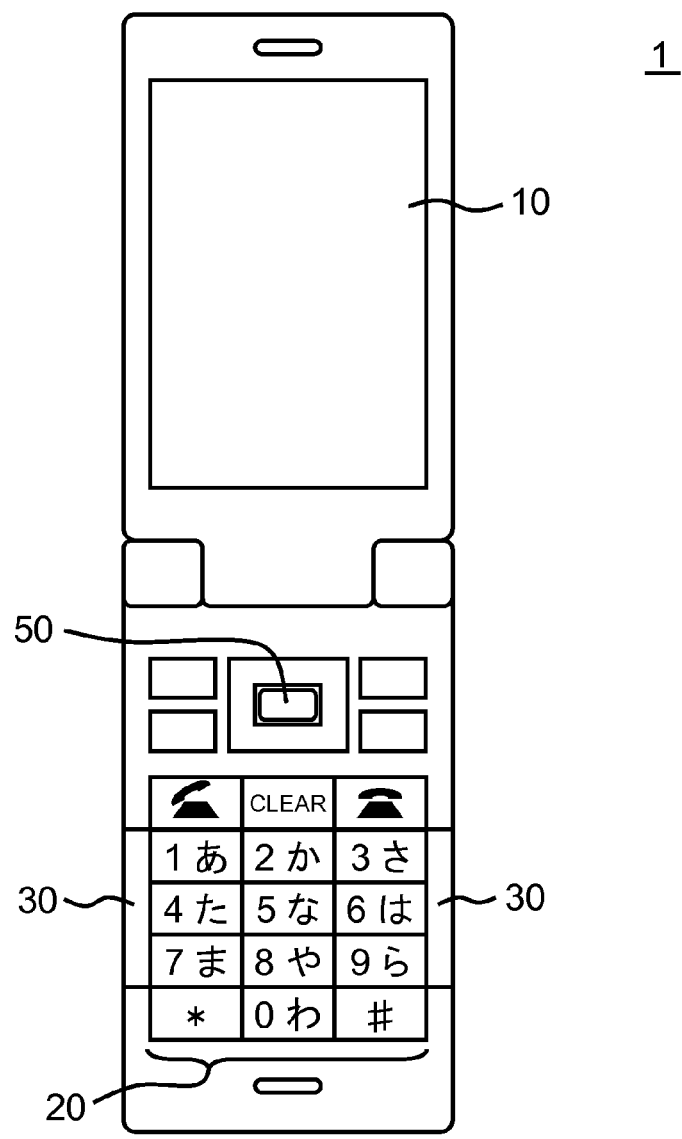
FIG. 1 is a plan view schematically showing an appearance of the electronic device according to Example 1 of the present invention.

An electronic device according to an exemplary embodiment 1 of the present invention includes a display unit (10 of FIG. 2) that displays a letter/character, and a touch pressing input unit (20 of FIG. 2) including a plurality of keys arrayed in a matrix. The touch pressing input unit allows touch-inputting a letter/character corresponding to a key touched by a user's finger. The touch pressing input unit also allows pressing input for pressing-inputting a letter/character corresponding to a key pressed. The electronic device also includes a control unit (40 of FIG. 2) that manages control to cause the letter/character input by the touch pressing input unit to be displayed on the display unit. The control unit also manages control so that, if a key is touched and pressed at the touch pressing input unit with the user's finger, a letter/character corresponding to the key pressed will be displayed on the display unit, and so that, if a key is touched and released without being pressed by the user's finger at the touch pressing input unit, a letter/character corresponding to a key released by the user's finger (i.e., a key disposed at a position from which the user's finger has been released) will be displayed on the display unit.

The letter/character inputting method according to an exemplary embodiment 2 of the present invention is such a letter/character inputting method that includes: displaying, when a key is touched and pressed at the touch pressing input unit by a user's finger, a letter/character corresponding to the key pressed on the display unit (step A4 of FIG. 4), and displaying, when a key is touched and released without being pressed by the user's finger at the touch pressing input unit, a letter/character corresponding to a key released by the user's finger (i.e., a key disposed at a position from which the user's finger has been released) on the display unit (step A6 of FIG. 4).

The program according to an exemplary embodiment 3 of the present invention is such a program allowing executing: processing of displaying, when a key is touched and pressed at the touch pressing input unit by a user's finger, a letter/character corresponding to the key pressed in the display unit (step A4 of FIG. 4), and processing of displaying, when a key is touched and released without being pressed by the user's finger at the touch pressing input unit, a letter/character corresponding to the key released by the user's finger (i.e., a key disposed at a position from which the user's finger has been released) on the display unit (step A6 of FIG. 4).

It is noted that symbols for referring to the drawings as used in the present application are only for assisting in understanding and are not intended for limiting to the modes shown in the drawings.

Example 1

Figure 2:
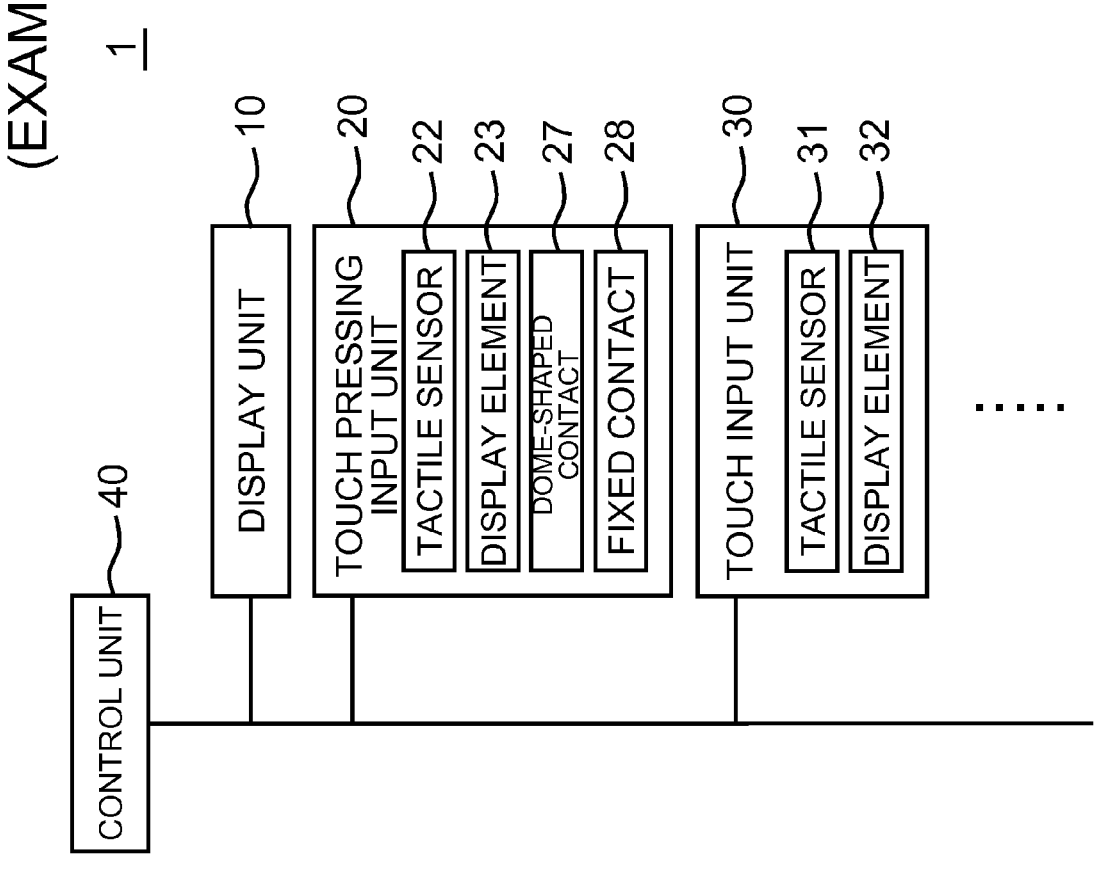
FIG. 2 is a block diagram schematically showing a circuit configuration of the electronic device according to Example 1 of the present invention.

An electronic device 1 according to Example 1 of the present invention will now be described with reference to the drawings. FIG. 1 depicts a plan view schematically showing the appearance of the electronic device according to Example 1 of the present invention. FIG. 2 depicts a block diagram schematically showing a circuit configuration of the electronic device according to Example 1 of the present invention. FIG. 3 depicts a schematic view showing the configuration of a touch pressing input unit in the electronic device according to Example 1 of the present invention.

The electronic device 1 according to Example 1 of the present invention is a mobile electronic device to which letter(s)/character(s) may be entered and which is capable of displaying the letter(s)/character(s) entered. The electronic device 1 may be a collapsible mobile phone, as shown in FIG. 1. In the plan view of FIG. 1, the electronic device 1 includes two touch input units 30 on both sides of a touch pressing input unit 20 that is to operate as an actuation unit. The electronic device also includes a display unit 10 on top of the touch pressing input unit 20.

The electronic device 1 includes, as component units, the display unit 10, the touch pressing input unit 20, the touch input units 30, and a control unit 40, as shown in FIG. 2.

The display unit 10 is a device that displays thereon the information, such as a letter/character, as entered. In appearance, the display unit 10 is arranged on top of the touch pressing input unit 20 in the electronic device 1 (see FIG. 1). The display unit 10 is electrically connected to the control unit 40 (see FIG. 2). The display unit 10 may be a liquid crystal display device, an organic EL display device or the like provided that the device used visually imparts the information to the user.

The touch pressing input unit 20 is a device that allows touch input (flick input) or pressing input, depending on actuation by a user. In appearance, the touch pressing input unit 20 includes a plurality of keys (including "Ten-keys" (or numerical keypad), a decision key 50 or the like) arrayed in a matrix. The touch pressing input unit 20 is disposed below the display unit 10 between the two touch input units 30 (see FIG. 1), and is electrically connected to the control unit 40 (see FIG. 2). The keys of the touch pressing input unit 20 detect the presence or absence of touch, based on a weak pressure due to touch, while detecting the presence or absence of pressing based on a strong pressure due to pressing. The touch pressing input unit 20 outputs to the control unit 40 a touch signal, indicating which of the keys the user is touching, or a pressing signal, indicating which of the keys the user is pressing. The touch pressing input unit 20 has a function to display the state of key actuation each time the key is actuated, in order for the user to recognize the state of his/her actuation. The touch pressing input unit 20 includes, on a substrate 29, a protective sheet 21, a tactile sensor 22, a display element 23, a key member 24, a protuberance 25, a hinge (portion) 26, a dome-shaped contact 27 and a fixed contact 28, from one key to another (see FIG. 3).

The protective sheet 21 is a sheet that protects the surface of the tactile sensor 22. The protective sheet 21 is affixed to the surface of the tactile sensor 22, and is transparent or semi-transparent to make the letters/characters displayed on the display element 23 visible.

The tactile sensor 22 is a sensor that detects the touch, and is affixed to the surface of the display element 23. The surface of the tactile sensor 22 is covered by the protective sheet 21. The tactile sensor 22 may, for example, be in the form of a touch panel composed by a thin felt sheet of carbon fibers and pair electrodes arranged on both sides of the felt sheet. When the user's finger touches a key, the tactile sensor 22 captures and detects it with binary values of on/off dependent on the touch pressure. The tactile sensor 22 is electrically connected to the control unit 40. The tactile sensor 22 detects (e.g.) changes in the electrical resistance between the electrodes caused by the finger's touch pressure to output a detected signal to the control unit 40. The presence or absence of the touch to the key may be detected by measuring any suitable physical quantities, such as changes in the electrical capacitance of the tactile sensor 22, in place of measuring the changes in its electrical resistance.

The display element 23 is a device that displays the navigation (with letters/characters) of the operation methods. The display element 23 is affixed to the surface of the key member 24 and has its surface covered by the tactile sensor 22. The display element 23 is electrically connected to the control unit 40. The display element 23 may be a liquid crystal display device, an organic EL display device or the like provided that the device used visually provides the information to the user.

The key member 24 is a component part that receives the pressing pressure from the user's finger, and has its surface covered by the display element 23. The key member 24 is mounted on the substrate 29 via the hinge 26 exhibiting repellant elasticity. The key member 24 includes the protuberance 25 on its surface facing the dome-shaped contact 27. When the key member 24 is pressed with more than a pre-set pressure, the protuberance 25 presses down the dome-shaped contact 27 mounted on the substrate 29. The dome-shaped contact 27 becomes dished under the press-down pressure to come into contact with the fixed contact 28. At the same time as key pressing-down is detected, a click feel is imparted to the user's finger under the repellant elasticity of the dome-shaped contact 27 and the hinge 26.

The substrate 29 is a circuit substrate in which the dome-shaped contact 27 and the fixed contact 28 are provided from one key member 24 to another. The fixed contact 28 is provided at a position on the substrate surface in register with the protuberance 25 of the key member 24. The dome-shaped contact 27 is provided to cover the fixed contact 28. The dome-shaped contact 27 exhibits repellant elasticity such that it becomes dished in shape under the force of pressing down of the key member 24 to come into contact with the fixed contact 28, and also such that the dome-shaped contact is moved away from the fixed contact 28 to resume its original position when the pressure of pressing the key member 24 is canceled. The dome-shaped contact 27 and the fixed contact 28 are electrically connected to the control unit 40. The pressing of the key is detected by the dome-shaped contact 27 and the fixed contact 28 coming into contact with each other.

The touch input units 30 allow touch input (flick input) by user's actuation, and are provided on left and right sides of the touch pressing input unit 20 (see FIG. 1). The touch input units 30 are electrically connected to the control unit 40 (see FIG. 2). Each touch input unit 30 senses the weak pressure due to touch to detect the presence or absence of touch. The touch input units 30 output to the control unit 40 a touch signal indicating whether or not the user's finger is touching. The touch input units 30 possess the function to display the state of actuation on the key at the touch pressing input unit 20, each time the key is actuated, and are configured to allow the user to recognize his/her actuation with ease. In a casing, not shown, of the electronic device 1, each of the touch input units 30 includes a protective sheet, not shown, a tactile sensor 31 and a display element 32 in this order when looking from its front surface side. The protective sheet, not shown, the tactile sensor 31 and the display element 32 in the touch input unit 30 may be configured like the protective sheet 21, the tactile sensor 22 and the display element 23 in the touch pressing input unit 20, respectively.

The protective sheet, not shown, is a sheet that protects the surface of the tactile sensor 31. The protective sheet is affixed to the surface of the tactile sensor 31, and is transparent or semi-transparent to make the letters/characters displayed on the display element 32 visible.

The tactile sensor 31 is a sensor that detects touch, and is affixed to the surface of the display element 32. The surface of the tactile sensor 31 is covered by a protective sheet, not shown. The tactile sensor 31 may, for example, be in the form of a touch panel formed by a thin felt sheet of carbon fibers sandwiched between pair electrodes. When the user's finger touches a key, its tactile sensor captures and detects the touch with binary values of on/off dependent on the touch pressure. The tactile sensor 31 is electrically connected to the control unit 40, and detects changes in the electrical resistance between the electrodes caused by the finger's touch pressure to output a detected signal to the control unit 40. The presence or absence of the touch to the key may be detected by measuring any suitable physical quantities, such as changes in the electrical capacitance of the tactile sensor 31, in place of measuring the changes in its electrical resistance.

The display element 32 is a device that displays the navigation of the operation methods in letters/characters. The display element 32 is affixed to the surface of the casing of the electronic device 1 and has its surface covered by the tactile sensor 31. The display element 32 is electrically connected to the control unit 40. The display element 32 may be a liquid crystal display device, an organic EL display device or the like provided that the device used visually provides the information to the user.

The control unit 40 includes a micro-processor as a principal component and, like the legacy computer device, includes storage means (unit), such as RAM or ROM. The operations of various component parts are controlled by program(s) stored in these storage means.

In Example 1, the display element(s) 23 is used in the touch pressing input unit 20, while the display element(s) 32 is used in the touch input unit(s) 30. However, from the perspective of reduction in cost or size, the display elements 23, 32 may be dispensed with. In the latter case, it is desirable to display a navigation intelligible to the user by ingenuously designing the printed marking on the touch pressing input unit 20 or on the touch input units 30, or corresponding demonstration on the display unit 10.

In Example 1, touch panels are used as the tactile sensors 22, 31. Alternatively, any sensor capable of detecting the touch may be used in place of panel- or sheet-shaped sensors.

The operation of the electronic device according to Example 1 of the present invention will be described with reference to the drawings. FIG. 4 depicts a flowchart schematically showing the operation of the control unit in the electronic device according to Example 1 of the present invention. FIG. 5 depicts a schematic view showing an example display state during the usual, non-actuated (stand by) times of the touch pressing input unit and the touch input units of the electronic device according to Example 1 of the present invention. FIG. 6 depicts a schematic view showing an example display state after touching a key 'あ' (A) of the touch pressing input unit and the touch input units of the electronic device of Example 1 of the present invention. As for the specific configuration of the electronic device 1, reference may be had to FIGS. 1 to 3.

Initially, the control unit 40 determines whether or not the key of the touch pressing input unit 20 has been touched by the user's finger (step A1). If the key has not been touched (NO of the step A1), processing reverts to the step A1.

If the key has been touched (YES at the step A1), and the user's finger has touched a key in the touch pressing input unit 20 for a pre-set time, the control unit 40 causes the input navigation corresponding to the so touched key to be displayed in letters/characters or the like on the display element 23 of the touch pressing input unit 20 (step A2). The input navigation may also be displayed on the display element 32 of the touch input units 30 as necessary.

In the step A2, the state of demonstration on the display element 23 of the touch pressing input unit 20 usually appears as shown for example in FIG. 5. When the user touches the key 'あ' (A) of the touch pressing input unit 20, the states of demonstration in the display elements 23 of the touch pressing input unit 20 and that in the display elements 32 of the touch input units 30 are changed as shown in FIG. 6. Specifically, it is shown visually which letter/character will be entered depending on in which direction the user's finger be slid at the time of flick input. As such, display is performed such that five characters are associated (or corresponded) to a single key in a pre-set sequence, and a row of the Japanese 50-character kana syllabary is selected based on the selected key. Then, a column of the kana syllabary is selected based on a direction of movement of an actuation point or actuation force (pressure) following a start of the actuation. In this manner, a single kana character may be selected by way of flick input.

After the step A2, the control unit 40 determines whether or not a key has been pressed in the touch pressing input unit 20 (step A3). If no key has been pressed (NO at the step A3), processing transfers to step A5.

If any key has been pressed (YES at the step A3), the control unit 40 performs pressing input processing in step A4 for the character pertinent to the pressed key (the corresponding character is displayed on the display unit 10). Then, processing reverts to the step A1 (start).

If no key has been pressed (NO at the step A3), the control unit 40 determines whether or not the user's finger has moved apart from the key in the touch input units 30 (step A5). If the user's finger has not moved apart from the key (NO at the step A5), processing reverts to the step A3.

If the user's finger has moved apart from the key (YES at the step A5), the control unit 40 performs flick input processing in step A6 for the character pertaining to the key which the user's finger has ultimately released (the corresponding character is displayed in the display unit 10). Then, processing reverts to the step A1.

In Example 1, the distinction between the pressing input and the flick input is made automatically. However, it may be set in advance, according to the user's favor, which of the inputs is to be used. By so doing, it is possible to prevent inputting failure in which a user attempting only key pressing input inadvertently touches a key before inputting the first letter/character to flick-input a letter/character in a manner contrary to his/her intention.

In Example 1, the flick-input navigation is displayed as soon as a key is touched. Alternatively, the navigation may be displayed after a key has been touched for a pre-set time. In the latter case, no foreign feeling will be imparted to a user exploiting just the key pressing input. However, if the display is retarded, there is a fear that a user exploiting just flick input may not feel comfortable. It is therefore necessary to properly adjust the time length until the navigation is displayed.

In Example 1, it is possible, in a configuration in which a letter/character may be entered by both the pressing inputting method and the flick input method, to make distinction automatically between the two methods to avoid an input error. It is noted that the former method that imparts the sense of click to the user has extensively been used, whereas the latter method has recently come into use in e.g., a touch panel type mobile phone. By this automatic distinction, the user may select the pressing input or the flick input in the present Example as desired. Moreover, by providing the touch pressing input unit 20 (i.e., pressing keys) with the display elements 23 and providing the touch input unit(s) 30 with the display elements 32, it is possible to implement an interface easier to use for the user. In addition, by arraying the touch input unit 30 (display fitted with a touch panel) laterally of the Ten-keys in the touch pressing input unit 20, flick input may be made with the use feeling of the user of the legacy Ten-key pressing input system unchanged. Since the flick input may be made without touching the main display unit 10, those who are desirous to make flick input and are not desirous to touch the main display for fear of his/her fingerprint being left thereon may also use the flick input.

Example 2

An electronic device according to Example 2 of the present invention will now be described with reference to the drawings. FIG. 7 depicts a flowchart schematically showing operation of a control unit in the electronic device of Example 2 of the present invention. FIG. 8 depicts a schematic view showing changes in the display state brought about by pressing a key 'あ' (A) of a touch pressing input unit in the electronic device of Example 2 of the present invention. FIG. 9 is a schematic view showing an input operation of inputting 'い' (I) in the touch input unit of the electronic device of Example 2.

Example 2 is a modification of Example 1, and differs from the latter in the operation of a control unit (corresponding to the control unit 40 of FIG. 2). In the present Example, the input mode is fixed at the pressing input mode (key pressing input system) to prevent that, when a user's finger has pressed a key and thereafter released the key, the letter/character as pressed is erroneously entered as a flick input. It is noted that the configuration of an electronic device is the same as that of the electronic device of Example 1 (see FIGS. 1 to 3). As for the configuration of components of the electronic device, reference may be made to FIGS. 1 to 3.

Initially, the control unit 40 verifies whether or not the user's finger has touched a key in the touch pressing input unit 20 (step B1). If the user's finger has not touched a key (NO of the step B1), processing reverts to the step B1.

If the user's finger has touched the key (YES of the step B1), the input navigation (letters/characters) for the key touched in the touch pressing input unit 20 is displayed, under control by the control unit 40, on the display element(s) 23 of the touch pressing input unit 20 (step B2). The input navigation may also be made on the display element(s) 32 of the touch input units 30 as necessary.

In the step B2, demonstration on the display elements 23 of the touch pressing input unit 20, shown for example in FIG. 5, is made as in usual manner. However, when the user touches a key 'あ' (A) in the touch pressing input unit 20, the demonstration on the display elements 23 of the touch pressing input unit 20 and that on the display elements 32 of the touch input units 30 are changed as shown in FIG. 6. Viz., it is visually displayed which letter/character will be entered dependent on in which direction the user's finger be slid in the course of flick input.

After the step B2, the control unit 40 verifies whether or not a key in the touch pressing input unit 20 has been pressed (step B3). If no key has been pressed (NO at the step B3), processing transfers to a step B8.

If a key has been pressed (YES at the step B3), the control unit 40 verifies the input to be a pressing input and sets the mode to a pressing input mode (step B4). It is noted that the pressing input mode is sustained until a letter/character input candidate is determined to be an input letter/character and, during the so sustained input mode, no flick input can be made. In Example 2, it is prevented from occurrence by this pressing input mode, that, when the user's finger has released the key that has been pressed, the corresponding letter/character is erroneously entered as being a flick input.

After the step B4, the control unit 40 causes demonstration that the mode is now at the pressing input mode (step B5). This demonstration is made on the display unit 10 in a manner intelligible to the user, such as by demonstration or lighting a lamp.

After the step B5, the control unit 40 manages control so that a letter/character, corresponding to the key pressed, and displayed on the display element 23, will be displayed on the display unit 10 as an input letter/character candidate(s) (step B6). The input letter(s)/character(s) is here termed a 'candidate(s)' because a decision whether or not to make conversion/non-conversion into a kanji character with the use of a prediction dictionary has not been made.

After the step B6, the control unit 40 manages control so that a letter/character to be entered as input letter/character candidate when a corresponding key to be pressed next time will be displayed on the display element 23 pertaining to the pressed key (step B7). For example, if, in case the key "あ" (A) is pressed twice, an input letter/character candidate "い" (I) is entered, the demonstration on the key is changed to "い" (I) if the key "あ" (A) is pressed as shown in FIG. 8.

If the key has not been pressed (NO at the step B3), the control unit 40 verifies whether or not the user's finger has moved apart from the key in the touch pressing input unit 20 (step B8). If the finger has not moved apart from the key (NO at step B8), processing reverts to the step B3.

If the user's finger has moved apart from the key (YES at the step B8), the control unit 40 verifies whether or not the input mode has been set to the pressing input mode (step B9). If the input mode has been set to the pressing input mode (YES at the step B9), processing transfers to step B11.

If the input mode has not been set to the pressing input mode (NO at the step B9), the control unit 40 determines that the input is the flick input. The control unit 40 manages control to display the letter/character, displayed on the key the user's finger has released (i.e., a key disposed at a position from which the user's finger has been released) or on the display element 23 or 32 of the touch input unit 20, on the display unit 10 as being an input letter/character candidate (step B10).

For example, if it is desired to enter 'あ' (A) in step B10, the 'あ' (A) key is touched with a finger, which is then immediately released from the key. On the other hand, if it is desired to enter 'い' (I), the 'あ' (A) key is first touched with the finger and then the finger is slid to a site of the character 'い' (I) displayed, where the finger releases the character, as shown in FIG. 9.

After the step B7, in case the pressing input mode has been set (YES at the step B9) or after the step B9, key pressing inputs or flick inputs of as many input letter/character candidates as the user desires to input may be made. When the user has finished inputting the desired input letter/character candidates, the control unit 40 manages control to execute the processing of conversion into kanji characters or conversion with the aid of a prediction dictionary, in response to the user's actuations (step B11). However, in the step B11, the processing of conversion may be skipped depending on the contents of the user's actuation. If it is desirable to leave the input non-converted, it is sufficient that the input letters/characters are ultimately set as definitely by the decision key 50 without performing the conversion operation.

After the step B11, the control unit 40 verifies whether or not the decision key 50 has been pressed (step B12). If the decision key 50 has not been pressed (NO at the step B12), processing reverts to the step B1.

If the decision key 50 has been pressed (YES at the step B12), and the pressing input mode has been set, the control unit 40 cancels the pressing input mode (step B13).

After the step B13, the control unit 40 finally sets the input character candidate as being an input character (step B14), followed by reverting to the step B1 (start).

In Example 2, it has been mentioned that, at the time of key pressing input or flick input, the letter/character displayed on the display element 23 corresponding to the key pressed or the key the user's finger has released is displayed on the display unit 10 as a letter/character input candidate. However, the demonstration may also be made in a different manner provided that a letter/character input can be selected by key pressing input or flick input. For example, if the input is the key pressing input, the demonstration may be made using a letter/character input table shown in Patent Literature 3. If the input is the flick input, the demonstration may be made by identifying the input letter/character candidate from the finger touch start and end points.

In Example 2, the input mode is set to the pressing input mode at the same time as the first letter/character is entered, only when the input is the key pressing input, such as to disable flick input. It is however possible to make the same setting for flick input. Viz., it is possible that, when the first letter/character is entered by flick input, only flick inputs are accepted until input letter/character candidates being entered are finally determined to be input letters/characters. By so doing, it is possible to inhibit input failure by key pressing input during the flick input. In this case, it is desirably indicated on the display unit 10, during an input operation, that the present state of operation is such a state that accepts only the key pressing input or the flick input. Such indication is preferably made in a way intelligible to the user, such as by demonstration on the display unit or by lamp lighting.

In Example 2, the navigation for flick input is displayed as soon as a key is touched. Alternatively, the navigation for flick input may be displayed after a key has been touched for a pre-set period of time. In the latter case, no uncomfortable feeling will be imparted to a user exploiting only the key pressing input. However, if the display is excessively retarded, there is fear that a user exploiting just flick input may not feel comfortable. It is therefore necessary to properly adjust the period of time until the navigation is displayed.

Example 2 may give rise to advantageous effects similar to those obtained with Example 1.

Example 3

An electronic device according to Example 3 of the present invention will now be described with reference to the drawings. FIG. 10 depicts a plan view schematically showing the appearance of an electronic device according to Example 3 of the present invention.

Example 3 is a modification of Example 1. In the present Example, the touch input units (30 of FIG. 1), provided on left and right sides of the touch pressing input unit 20, are dispensed with and the sizes of pre-set keys of the touch pressing input unit 20 are enlarged in the left-right direction. Viz., the transverse lengths of the pre-set keys are made longer than the other keys, as shown in FIG. 10, in order to allow the finger slide direction to be identified only by a tactile sensor (equivalent to 22 of FIG. 3) pertaining to the key. Otherwise, the present Example is similar to Example 1 in configuration and operation.

In Example 3, pre-set Ten-keys are elongated in size in the transverse direction to allow for flick input with the use feeling to the user of the legacy Ten-key pressing input unchanged.

It is noted that, when the first letter/character has been entered by key pressing input or flick input in the Examples 1 to 3, an input mode may be set respectively to the key pressing input mode or the flick input mode until the input letters/characters being entered are finally set as input letters/characters or an application being used comes to a close. Or, the inputting mode may be set beforehand to the key pressing input or flick input. By so doing, it is possible to inhibit input error that a key is touched during the key pressing input mode operation to cause flick input or that a key is pressed erroneously during the flick input mode operation.

In the Examples 1 to 3, the input mode may also be selected and set from one application to another. In this case, it is possible for a user to select and use an input mode he/she feels desirable from one application to another.

Moreover, in the Examples 1 to 3, the contents of an address book or the Web may immediately be searched in case of flick input, or a telephone number may be entered in case of pressing input, with the state of the display picture being a standby display picture. This enhances user friendliness in comparison with the case of a terminal that allows only for key pressing input or flick input.

The particular exemplary embodiments or examples may be modified or adjusted within the gamut of the entire disclosure of the present invention, inclusive of claims, based on the fundamental technical concept of the invention. Moreover, a wide variety of combinations or selection of elements disclosed herein may be made within the framework of the claims. Viz., the present invention may naturally cover a wide variety of modifications or corrections that may occur to those skilled in the art in accordance with the entire disclosure of the present invention, inclusive of claim and the technical concept of the present invention. Also numerical values recited in the present disclosure may be selected or adjusted as desired.

What is claimed is:

1. An electronic device, comprising
a display unit that displays a letter/character;
a touch pressing input unit including a plurality of keys arrayed in a matrix; the touch pressing input unit allowing touch-inputting a letter/character corresponding to a key touched by a user's finger; the touch pressing input unit allowing pressing-inputting a letter/character corresponding to a key pressed; and
a microprocessor that manages a control of the display unit and the touch pressing unit to cause the letter/character input by the touch pressing input unit to be displayed on the display unit; and
a touch input unit arranged at a pre-set location at a periphery of the touch pressing input unit, the touch input unit being able to touch-input a corresponding letter/character when the touch input unit is touched by the user's finger,
wherein the microprocessor manages the control of the display unit and the touch pressing input unit so that, if a key is touched and pressed at the touch pressing input unit with the user's finger, a letter/character corresponding to the key pressed is displayed on the display unit, and so that, if a key is touched and released without being pressed by the user's finger at the touch pressing input unit, a letter/character corresponding to a key disposed at a position from which the user's finger has been released is displayed on the display unit;
the microprocessor manages the control of the display unit and the touch pressing input unit to display a corresponding letter/character on the display unit when the user's finger has touched and released the touch input unit;
the touch pressing input unit includes a display element configured to display a letter/character from one key to another;
the touch input unit includes another display element configured to display a letter/character;
the microprocessor manages the control of the display unit and the touch pressing input unit so that, when a user's finger has touched a key for a pre-set time, an input navigation corresponding to the touched key will be displayed on the corresponding display element and on the other display element,
the touch pressing input unit comprises: from one key to another, a key member arranged on a substrate via a hinge exhibiting repellant elasticity, a dome-shaped contact, a fixed contact and a tactile sensor;
the dome-shaped contact and the fixed contact come into contact with each other when the key member is pressed such as to detect the pressing of the key; and
the tactile sensor is mounted on the key member to detect touching by the user's finger.

2. The electronic device according to claim 1, wherein,
upon initiation of an input operation at the touch pressing input unit, the microprocessor sets an input mode to a pressing input mode if the key is touched and pressed by the user's finger at the touch pressing input unit; the microprocessor setting the input mode to a touch input mode if the key is touched and released without being pressed by the user's finger at the touch pressing input unit.

3. The electronic device according to claim 2, wherein,
the microprocessor secures the input mode to the pressing input mode or to the touch input mode until an input letter/character is finally determined or until an application being used comes to a close.

4. The electronic device according to claim 3, further comprising:
a touch input unit arranged at a pre-set location at a periphery of the touch pressing input unit; the touch input unit being able to touch-input a corresponding letter/character when the touch-input unit is touched by the user's finger; and
the microprocessor managing control to display a corresponding letter/character on the display unit when the user's finger has touched and released the touch input unit.

5. The electronic device according to claim 4, wherein,
the touch pressing input unit includes a display element to display a letter/character from one key to another;
the touch input unit including another display element to display a letter/character; and
the microprocessor managing control so that, when a user's finger has touched a key for a pre-set time, an input navigation corresponding to the key touched will be displayed on the corresponding display element and on the other display element.

6. The electronic device according to claim 3, wherein,
while the display unit displays a standby display picture, the microprocessor sets a telephone number input mode when a user's finger has pressed a key in the touch pressing input unit; the microprocessor setting an address book searching mode or a Web searching mode when the user's finger has touched and then released the key in the touch pressing input unit.

7. The electronic device according to claim 2, further comprising:
a touch input unit arranged at a pre-set location at a periphery of the touch pressing input unit; the touch input unit being able to touch-input a corresponding letter/character when the touch-input unit is touched by the user's finger; and
the microprocessor managing control to display a corresponding letter/character on the display unit when the user's finger has touched and released the touch input unit.

8. The electronic device according to claim 7, wherein,
the touch pressing input unit includes a display element to display a letter/character from one key to another;
the touch input unit including another display element to display a letter/character; and
the microprocessor managing control so that, when a user's finger has touched a key for a pre-set time, an input navigation corresponding to the key touched will be displayed on the corresponding display element and on the other display element.

9. The electronic device according to claim 2, wherein,
while the display unit displays a standby display picture, the microprocessor sets a telephone number input mode when a user's finger has pressed a key in the touch pressing input unit; the microprocessor setting an address book searching mode or a Web searching mode when the user's finger has touched and then released the key in the touch pressing input unit.

10. The electronic device according to claim 1, wherein,
a pre-set one or ones of the plurality of keys is transversely elongated in shape as compared to the other keys.

11. The electronic device according to claim 1, wherein, the touch input unit comprises: a tactile sensor which is configured to detect touch pressure by the user's finger.

12. The electronic device according to claim 1, wherein, the microprocessor is set to one out of the pressing input mode and the touch input mode depending on an application being used.

13. The electronic device according to claim 1, wherein, while the display unit displays a standby display picture, the microprocessor sets a telephone number input mode when a user's finger has pressed a key in the touch pressing input unit; the microprocessor setting an address book searching mode or a Web searching mode when the user's finger has touched and then released the key in the touch pressing input unit.

14. A method for inputting a letter/character using an electronic device that comprises:
a display unit that displays a letter/character;
a touch pressing input unit including a plurality of keys arrayed in a matrix; the touch pressing input unit allowing touch-inputting a letter/character corresponding to a key touched by a user's finger; the touch pressing input unit allowing pressing-inputting a letter/character corresponding to a key pressed;
a control unit that manages control to cause the letter/character input by the touch pressing input unit to be displayed on the display unit; and
a touch input unit arranged at a pre-set location at a periphery of the touch pressing input unit, the touch input unit being able to touch-input a corresponding letter/character when the touch input unit is touched by the user's finger,
wherein the touch pressing input unit includes a display element configured to display a letter/character from one key to another;
the touch input unit includes another display element configured to display a letter/character;
the touch pressing input unit comprises: from one key to another, a key member arranged on a substrate via a hinge exhibiting repellant elasticity, a dome-shaped contact, a fixed contact and a tactile sensor;
the dome-shaped contact and the fixed contact come into contact with each other when the key member is pressed such as to detect the pressing of the key; and
the tactile sensor is mounted on the key member to detect touching by the user's finger, and
the method comprising:
displaying, when a key is touched and pressed at the touch pressing input unit by a user's finger, a letter/character corresponding to the key pressed on the display unit,
displaying, when a key is touched and released without being pressed by the user's finger at the touch pressing input unit, a letter/character corresponding to a key disposed at a position from which the user's finger has been released on the display unit;
displaying a corresponding letter/character on the display unit when the user's finger has touched and released the touch input unit; and
displaying, when a user's finger has touched a key for a pre-set time, an input navigation corresponding to the touched key on the corresponding display element and on the other display element.

15. A non-transitory computer-readable medium storing a program executed by an electronic device that comprises:
a display unit that displays a letter/character;
a touch pressing input unit including a plurality of keys arrayed in a matrix; the touch pressing input unit allowing touch-inputting a letter/character corresponding to a key touched by a user's finger; the touch pressing input unit allowing pressing-inputting a letter/character corresponding to a key pressed;
a control unit that manages control to cause the letter/character input by the touch pressing input unit to be displayed on the display unit; and
a touch input unit arranged at a pre-set location at a periphery of the touch pressing input unit, the touch input unit being able to touch-input a corresponding letter/character when the touch input unit is touched by the user's finger,
wherein the touch pressing input unit includes a display element configured to display a letter/character from one key to another;
the touch input unit includes another display element configured to display a letter/character;
the touch pressing input unit comprises: from one key to another, a key member arranged on a substrate via a hinge exhibiting repellant elasticity, a dome-shaped contact, a fixed contact and a tactile sensor;
the dome-shaped contact and the fixed contact come into contact with each other when the key member is pressed such as to detect the pressing of the key; and
the tactile sensor is mounted on the key member to detect touching by the user's finger, and
the program allowing executing:
displaying, when a key is touched and pressed at the touch pressing input unit by a user's finger, a letter/character corresponding to the key pressed on the display unit;
displaying, when a key is touched and released without being pressed by the user's finger at the touch pressing input unit, a letter/character corresponding to a key disposed at a position from which the user's finger has been released on the display unit;
displaying a corresponding letter/character on the display unit when the user's finger has touched and released the touch input unit; and
displaying, when a user's finger has touched a key for a pre-set time, an input navigation corresponding to the touched key on the corresponding display element and on the other display element.

* * * * *